(12) United States Patent
Jha et al.

(10) Patent No.: US 12,333,244 B2
(45) Date of Patent: Jun. 17, 2025

(54) AUTOMATED ADDRESS DATA DETERMINATIONS USING ARTIFICIAL INTELLIGENCE TECHNIQUES

(71) Applicant: Dell Products L.P., Round Rock, TX (US)

(72) Inventors: Saurabh Jha, Bangalore (IN); Guhesh Swaminathan, Chennai (IN); Sailendu Kumar Patra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 253 days.

(21) Appl. No.: 17/742,750

(22) Filed: May 12, 2022

(65) Prior Publication Data

US 2023/0367961 A1    Nov. 16, 2023

(51) Int. Cl.
| | | |
|---|---|---|
| G06F 3/044 | (2006.01) |
| G06F 40/205 | (2020.01) |
| G06F 40/295 | (2020.01) |
| G06N 3/043 | (2023.01) |
| G06N 3/044 | (2023.01) |

(52) U.S. Cl.
CPC .......... G06F 40/205 (2020.01); G06F 40/295 (2020.01); G06N 3/043 (2023.01); G06N 3/044 (2023.01)

(58) Field of Classification Search
None
See application file for complete search history.

(56) References Cited

U.S. PATENT DOCUMENTS

| | | | | |
|---|---|---|---|---|
| 7,133,404 B1 * | 11/2006 | Alkhatib | ................. | H04W 8/26 |
| | | | | 370/392 |
| 7,634,463 B1 * | 12/2009 | Katragadda | ............ | G06Q 10/10 |
| | | | | 707/999.102 |
| 9,378,200 B1 | 6/2016 | Cohen et al. | | |
| 9,672,279 B1 | 6/2017 | Cohen et al. | | |
| | (Continued) | | | |

OTHER PUBLICATIONS

Jason Chiu et al., Named Entity Recognition with Bidirectional LTSM-CNN's, Transaction of the Association for Computational Linguistics., vol. 4, p. 357-370 (Year: 2016).*

(Continued)

*Primary Examiner* — Jakieda R Jackson
(74) *Attorney, Agent, or Firm* — Ryan, Mason & Lewis, LLP

(57) ABSTRACT

Methods, apparatus, and processor-readable storage media for automated address data determinations using artificial intelligence techniques are provided herein. An example computer-implemented method includes extracting address information from one or more documents using at least one artificial intelligence-based address extraction model; parsing, into one or more address components, at least a portion of the extracted address information using at least one artificial intelligence-based parsing model; comparing at least a portion of the one or more parsed address components to stored address information using at least one artificial intelligence-based scoring model; and performing one or more automated actions based at least in part on results from the comparing of at least a portion of the one or more parsed address components to stored address information.

20 Claims, 9 Drawing Sheets

(56) References Cited

U.S. PATENT DOCUMENTS

| | | | |
|---|---|---|---|
| 10,127,304 B1 | 11/2018 | Cohen et al. | |
| 10,235,452 B1 | 3/2019 | Savir et al. | |
| 10,394,761 B1* | 8/2019 | Moyer | G06F 16/24578 |
| 10,713,577 B1* | 7/2020 | Faruquie | G06N 5/022 |
| 10,803,399 B1 | 10/2020 | Cohen et al. | |
| 11,714,965 B2* | 8/2023 | Wyss | G06F 40/35 |
| | | | 704/9 |
| 11,886,820 B2* | 1/2024 | Menon | G06N 20/00 |
| 2002/0184390 A1* | 12/2002 | Alkhatib | H04L 69/161 |
| | | | 709/227 |
| 2003/0105824 A1* | 6/2003 | Brechner | G06Q 10/107 |
| | | | 709/206 |
| 2004/0205243 A1* | 10/2004 | Hurvig | H04L 63/104 |
| | | | 709/245 |
| 2006/0004719 A1* | 1/2006 | Lawrence | H04L 63/1433 |
| 2007/0147659 A1* | 6/2007 | Eremita | G06V 30/268 |
| | | | 382/101 |
| 2008/0177561 A1* | 7/2008 | Bonnell | G06Q 10/083 |
| | | | 705/317 |
| 2009/0006394 A1* | 1/2009 | Snapp | G06F 16/284 |
| 2015/0363843 A1* | 12/2015 | Loppatto | G06Q 30/0283 |
| | | | 705/330 |
| 2017/0262857 A1* | 9/2017 | Sarkar | G06F 16/2365 |
| 2019/0103111 A1* | 4/2019 | Tiwari | G06F 16/3329 |
| 2019/0182382 A1* | 6/2019 | Mazza | H04M 3/527 |
| 2020/0175304 A1* | 6/2020 | Vig | G06F 40/295 |
| 2020/0210442 A1* | 7/2020 | Bergeron | G06N 20/00 |
| 2020/0387819 A1* | 12/2020 | Rogynskyy | H04L 51/212 |
| 2021/0012215 A1* | 1/2021 | Fei | G06F 40/30 |
| 2021/0081463 A1* | 3/2021 | Walker | G06F 16/958 |
| 2021/0081613 A1* | 3/2021 | Begun | G06F 40/289 |
| 2021/0374522 A1* | 12/2021 | Huang | G06Q 50/60 |
| 2021/0406779 A1* | 12/2021 | Hu | G06N 3/045 |
| 2022/0050824 A1* | 2/2022 | Gartner | G06F 16/2365 |
| 2022/0083964 A1* | 3/2022 | Silverstein | G06Q 30/0282 |
| 2022/0121964 A1* | 4/2022 | Ramakrishnan | G06N 5/022 |
| 2022/0129688 A1* | 4/2022 | Yu | G06Q 10/0838 |
| 2022/0138191 A1* | 5/2022 | Hermanek | G06F 16/21 |
| | | | 707/769 |
| 2022/0156300 A1* | 5/2022 | Paruchuri | G06V 10/82 |
| 2022/0229993 A1* | 7/2022 | Vu | G06V 30/19147 |
| 2022/0237230 A1* | 7/2022 | Zovic | G06N 5/022 |
| 2022/0318315 A1* | 10/2022 | Wyle | G06V 30/414 |
| 2022/0374602 A1* | 11/2022 | Park | G06F 40/295 |
| 2023/0159059 A1* | 5/2023 | Garimella | G05D 1/246 |
| | | | 701/26 |
| 2023/0196469 A1* | 6/2023 | Singh | G06V 30/10 |
| | | | 705/3 |
| 2023/0351780 A1* | 11/2023 | Maiman | G10L 15/26 |
| 2023/0388422 A1* | 11/2023 | Cherukara | H04M 3/42102 |

OTHER PUBLICATIONS

Wikipedia, Robotic process automation, https://en.wikipedia.org/w/index.php?title=Robotic_process_automation&oldid=1084045031, Apr. 22, 2022.

Wikipedia, ABBYY Fine Reader, https://en.wikipedia.org/w/index.php?title=ABBYY_FineReader&oldid=1082321823, Apr. 12, 2022.

Wikipedia, Alteryx, https://en.wikipedia.org/w/index.php?title=Alteryx&oldid=1078943432, Mar. 24, 2022.

Wikipedia, Microsoft Azure, https://en.wikipedia.org/w/index.php?title=Microsoft_Azure&oldid=1085299553, Apr. 29, 2022.

Entrinsik.com, https://entrinsik.com/informer/, May 5, 2022.

Wikipedia, Long short-term memory, https://en.wikipedia.org/w/index.php?title=Long_short-term_memory&oldid=1085879235, May 2, 2022.

Wikipedia, Autoregressive integrated moving average, https://en.wikipedia.org/w/index.php?title=Autoregressive_integrated_moving_average&oldid=1086361303, May 5, 2022.

Nishida, K., Exploratory.io, An Introduction to Time Series Forecasting with Prophet in Exploratory, Apr. 12, 2017.

Rigby, J., TowardsDataScience.com, AddressNet: How to build a robust street address parser using a Recurrent Neural Network, Dec. 5, 2018.

Github.com, Libpostal, https://github.com/openvenues/libpostal, May 5, 2022.

* cited by examiner

FIG. 2

| ADDRESS # | COMPONENT | CATEGORY | EMBEDDING | CATEGORY_ID |
|---|---|---|---|---|
| ADDRESS 1 | ABC COMPANY | COMPANY_NAME | ARRAY([0.2648115, -0.00934051, -0.89082056, -0.3150706 | 0 |
| ADDRESS 1 | MR. XXXXX | CONTACT_NAME | ARRAY([0.21207124, -0.25793734, -0.30883256, -0.604162 | 1 |
| ADDRESS 1 | 1234 | HOUSE_NUM | ARRAY([-0.1426948, -0.05421225, -0.03131096, 0.141052 | 2 |
| ADDRESS 1 | ABC HOUSE | HOUSE_NAME | ARRAY([0.24545515, 0.01146091, -0.4873581, -0.4989458 | 3 |
| ADDRESS 1 | YYY CITY | CITY_NAME | ARRAY([0.04570679, 0.11748195, -0.01484036, 0.3602427 | 4 |
| ADDRESS 1 | XYZ | STATE | ARRAY([-0.15742794, 0.20097324, 0.26760942, 0.0072686 | 5 |
| ADDRESS 1 | XXXXYYYY | COUNTY | ARRAY([0.05644534, 0.01206689, 0.5696771, 0.3830906 | 6 |
| ADDRESS 1 | XYZ 1234 | POSTAL_CODE | ARRAY([-0.25504512, -0.3194611, -0.17278698, 0.1119352 | 7 |

| ENTITY | PARSING MODEL | MATCHING ALGORITHM |
|---|---|---|
| CUSTOMER NAME | NER | EXACT |
| CONTACT NAME | NER | FUZZY |
| HOUSE (NAME+NUMBER) | PRETRAINED NER | JARO WINKLER |
| STREET | PRETRAINED NER | JARO WINKLER |
| CITY | PRETRAINED NER | FUZZY |
| POSTAL CODE | PRETRAINED NER | FUZZY/EXACT |
| COUNTRY | PRETRAINED NER | FUZZY |

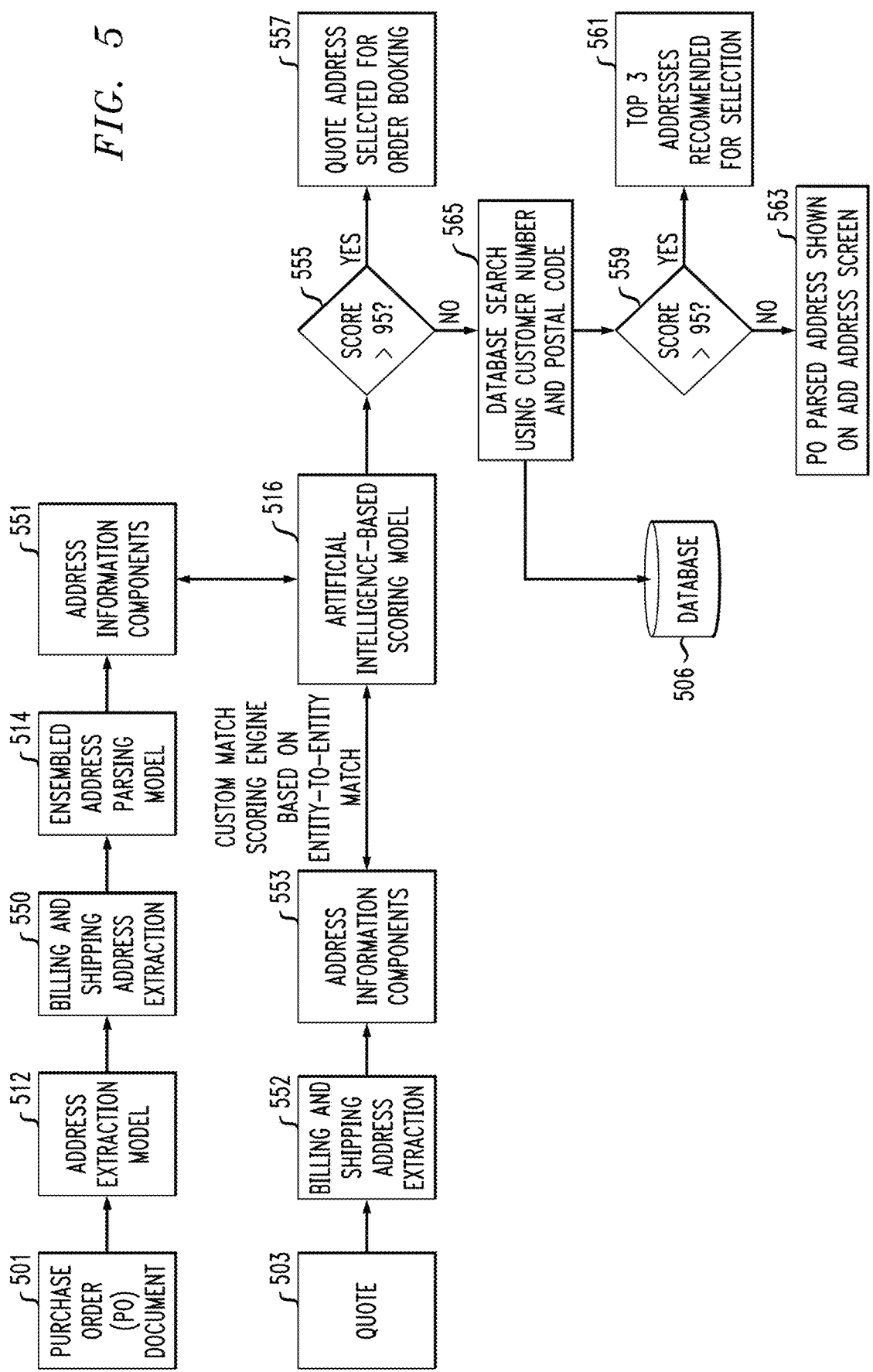

Input: PO Document
Output: Address Block as string
1. From the PO Doc, words and corresponding positional coordinates are extracted using OCR/Text Extraction mechanism
2. The document is converted into images page-wise
3. The output of both Step 1 and Step 2 is provided to the Graph Neural Network AI Model which determines which words/position corresponds to the Address block
4. The determined group of words along with the position is extracted and sent to a post processing block
5. The output of the Post Processing is the Address block used by Parsing algorithm for further processing

Input: Address Block
Output: DataFrame consisting of individual Address entity
1. Pass the address block through an Address Expander unit which expends address abbreviations
2. The expanded address is passed through the Custom NER for the identification of Customer Name and Contact Name which is designed using Keras Bi-LSTM based NER
3. The Identified names are removed from the address block before passing it to the Pre-Trained address NER
4. The address block without names are passed on to the Pre-Trained NER to get the individual address entity in a tabular format

FIG. 8

Input: 2 Addresses in parsed structural format
Output: Similarity Score
1. Parsed Addresses are standardized for Country, abbreviations to make it comparable.
2. Each Address Entity is individually compared between the addresses using the algorithm mentioned in Fig 4
3. The Similarity Percentage of each entity is cumulated
4. The Final score is averaged to the number of entity
5. Return Final Score

FIG. 9

```
model = Sequential()
model.add(Embedding(input_dim=input_dim, output_dim=output_dim, input_length=input_length))
model.add(Bidirectional(LSTM(units=output_dim, return_sequences=True, dropout=0.2, recurrent_dropout=0.2), merge_mode = 'concat'))
model.add(LSTM(units=output_dim, return_sequences=True, dropout=0.5, recurrent_dropout=0.5))
model.add(TimeDistributed(Dense(n_tags, activation="relu")))
adam = k.optimizers.Adam(lr=0.0005, beta_1=0.9, beta_2=0.999)
model.compile(loss='categorical_crossentropy', optimizer='adam', metrics=['accuracy'])
```

AUTOMATED ADDRESS DATA DETERMINATIONS USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for data processing using such systems.

BACKGROUND

Transaction processing (e.g., order processing) can often rely prominently on validating transaction-related information prior to execution and/or completion of the given transaction. If inaccurate and/or incorrect information is entered during one or more phases of a given transaction, one or more downstream implications can arise (e.g., transaction cancellation, resource wastage, delays, user dissatisfaction, etc.). Address information presents particular challenges with respect to validation, as address information is often unstructured and varied across users and/or enterprises. However, conventional transaction processing techniques are commonly resource-intensive and error-prone.

SUMMARY

Illustrative embodiments of the disclosure provide techniques for automated address data determinations using artificial intelligence techniques. An exemplary computer-implemented method includes extracting address information from one or more documents using at least one artificial intelligence-based address extraction model, and parsing, into one or more address components, at least a portion of the extracted address information using at least one artificial intelligence-based parsing model. The method also includes comparing at least a portion of the one or more parsed address components to stored address information using at least one artificial intelligence-based scoring model, and performing one or more automated actions based at least in part on results from the comparing of at least a portion of the one or more parsed address components to stored address information.

Illustrative embodiments can provide significant advantages relative to conventional transaction processing techniques. For example, problems associated with resource-intensive and error-prone techniques are overcome in one or more embodiments through automatically identifying and/or recommending address information in various contexts using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 2 shows an example data sample for training a named entity recognition (NER) model in an illustrative embodiment.

FIG. 4 shows a table depicting an example pairing of artificial intelligence-based parsing models and artificial intelligence-based scoring models with various address information components in an illustrative embodiment.

FIG. 5 depicts a complete flow of the process of address extraction, address parsing, address matching and recommendation generation in accordance with the above-noted example use case in an illustrative embodiment.

FIG. 6 shows example pseudocode for implementing at least a portion of an artificial intelligence-based extraction algorithm in an illustrative embodiment.

FIG. 7 shows example pseudocode for implementing at least a portion of an artificial intelligence-based address parsing algorithm in an illustrative embodiment.

FIG. 8 shows example pseudocode for implementing at least a portion of an artificial intelligence-based scoring model in an illustrative embodiment.

FIG. 9 shows example pseudocode for implementing at least a portion of a Keras-based bidirectional long short-term memory-based (LSTM-based) NER model in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
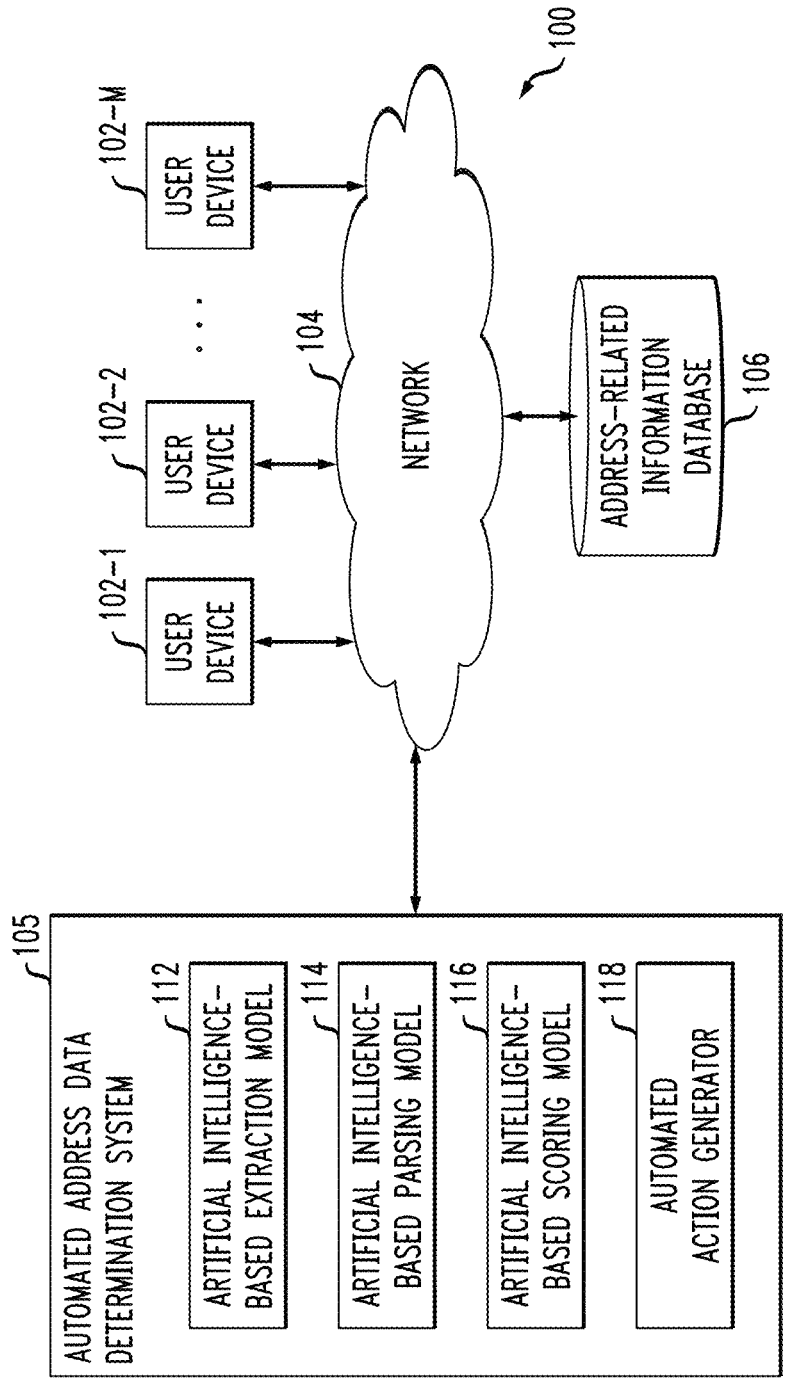
FIG. 1 shows an information processing system configured for automated address data determinations using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated address data determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated address data determination system 105 can have an associated address-related information database 106 configured to store data pertaining to various address components, which comprise, for example, shipping addresses, user/customer names, contact information, residence addresses, geographic identification information, etc.

The address-related information database 106 in the present embodiment is implemented using one or more storage systems associated with automated address data determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated address data determination system 105 are one or more input-output devices, which illustratively comprise keyboards, displays or other types of input-output devices in any combination. Such input-output devices can be used, for example, to support one or more user interfaces to automated address data determination system 105, as well as to support communication between automated address data determination system 105 and other related systems and devices not explicitly shown.

Additionally, automated address data determination system 105 in the FIG. 1 embodiment is assumed to be implemented using at least one processing device. Each such processing device generally comprises at least one processor and an associated memory, and implements one or more functional modules for controlling certain features of automated address data determination system 105.

More particularly, automated address data determination system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated address data determination system 105 to communicate over the network 104 with the user devices 102, and illustratively comprises one or more conventional transceivers.

The automated address data determination system 105 further comprises artificial intelligence-based extraction model 112, artificial intelligence-based parsing model 114, artificial intelligence-based scoring model 116, and automated action generator 118.

It is to be appreciated that this particular arrangement of elements 112, 114, 116 and 118 illustrated in the automated address data determination system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automated address data determinations using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated address data determination system 105 and address-related information database 106 can be on and/or part of the same processing platform.

An exemplary process utilizing elements 112, 114, 116 and 118 of an example automated address data determination system 105 in computer network 100 will be described in more detail with reference to the flow diagram of FIG. 10.

Accordingly, at least one embodiment includes implementing automated end-to-end (E2E) address selection techniques using an artificial intelligence-based ensembled address data extraction, address data parsing, and address data matching algorithm. Such an embodiment includes automatically extracting address information (e.g., billing address information, shipping address information, etc.) from one or more documents and/or data sources (e.g., a purchase order) using at least one artificial intelligence-based address extraction model (as further detailed, for example, in connection with FIG. 6). The extracted address information can then be parsed using at least one artificial intelligence-based parsing model (as further detailed, for example, in connection with FIG. 7). Additionally, based at least in part on the output of the artificial intelligence-based parsing model, such an embodiment includes performing entity-to-entity matching, using an artificial intelligence-based scoring model (as further detailed, for example, in connection with FIG. 8), for validating at least a portion of the parsed address information against stored address information (e.g., address information stored in a transaction-related enterprise database). If a resulting matching score is below a predetermined threshold value, one or more embodiments include recommending, via the artificial intelligence-based scoring model, address information (e.g., one or more appropriate addresses) from the stored address information that matches at a higher matching score.

At least one embodiment includes using at least one graph neural network leveraging textual features and visual features for address extraction. In connection with address information parsing, one or more embodiments include implementing multiple NER models. Such NER models can include, for example, a pretrained NER model which is trained on global addresses and capable of extracting address components, and/or a custom NER model (e.g., a Keras-based bidirectional LSTM model) trained on particular addresses (e.g., addresses related to transactions with a given enterprise) for parsing certain aspects of address information (e.g., customer name, contact name, etc.). In connection with address matching and recommendation tasks, at least one embodiment includes implementing at least one custom scoring model using a combination of fuzzy logic, one or more distance-related algorithms (e.g., a Jaro-Winkler distance measure for matching of address aspects such as house number, street number and/or name, etc.), and one or more enterprise-specific rules.

Although at least one embodiment is described herein within a context related to purchase orders, it is to be appreciated that one or more embodiments can include implementation across multiple use case applications involving address validation (e.g., automating shipping document processing in logistics contexts, invoice and receipt processing for validating billing address entities, maintaining and managing addresses in one or more databases, etc.).

As noted above and further detailed herein, one or more embodiments include performing address information extraction using at least one graph neural network-based document intelligence model. In such an embodiment, the graph neural network implemented in connection with the above-noted document intelligence model includes an input layer, an encoder, a graph layer, and a decoder. The input layer is able to provide the text present in the PDF and/or image, bounding box coordinates for each word in the PDF and/or image, and the complete page in an image format. The encoder can include a combination of multiple networks, such as a Fourier Network to learn the text embeddings, and a convolutional neural network (CNN) and/or dilated residual network to learn visual embeddings (e.g., from at least one bounding box). The graph layer learns features combining the text, position and layout of the entire image. Also, the decoder includes bidirectional LSTM (BiLSTM) and conditional random field (CRF) layers, and classifies each entity (e.g., the address block from other information) in the given document. Further, the output of the decoder includes blocks of various entities in the given document (e.g., a PO document), out of which address blocks (e.g., shipping and billing address blocks) are used as further detailed herein.

In such an embodiment, the model can handle complex scenarios such as, for example, address ambiguity (e.g., multiple address having the same format), two-dimensional (2D) layout (e.g., texts with different font sizes and shapes), positional variability, etc. More specifically, in one or more embodiments, the graph neural network model is trained on multiple documents (e.g., thousands of purchase order documents) through which the model learns the layout, context and position at which addresses could be potentially available. Through this learning, the architecture sets weights to each of the neurons present, which assists in handling such complexities.

One or more embodiments also include address information parsing, which takes input from the above-described address extraction model. In an example embodiment, address parsing is performed using two NER models: a first pretrained NER model capable of parsing one or more address components (e.g., house information, street information, postal code information, city information, state information, country information, etc.), and a second NER which is a Keras-based bidirectional LSTM architecture trained on user-specific (e.g., enterprise-specific) address data for parsing particular address aspects (e.g., customer name and contact name). In such an embodiment, the first pretrained NER is trained specifically for parsing certain attributes such as, for example, customer name and contact name. Additionally, such an embodiment can include processing input data in the form of sequential address data, which can be tagged for various address entities that were embedded using character-level embedding.

As also detailed herein, at least one embodiment includes address matching and address recommendation generation. By way of example, in such an embodiment, a parsed purchase order address is compared against a (stored) quote address using at least one artificial intelligence-based algorithm which is formulated by combining multiple distance measures (e.g., Jaro-Winkler distance measure, Levenshtein distance measure, etc.) and an exact match principle which depends at least in part on the type of entity being compared. In such an example embodiment, if the resulting match score is below a given threshold value (e.g., less than a 95% match), then an optimized search is carried out in one or more databases (e.g., an enterprise transaction-related address database). By way of example, in the above-noted purchase order use case context, a customer number and postal code extracted from the parsed address can be used to search an enterprise customer address-related database. Further, at least one matching algorithm can be implemented and run against all fetched addresses, and can return and/or identify a given number of the addresses (e.g., top-k addresses) having the highest and/or best matching score. In such an embodiment, the matching algorithm can be the same as the scoring algorithm described above and/or herein. By way of example, each of the addresses retrieved from a customer address database can be compared to a purchase order address, and scores for individual comparisons are obtained. The obtained comparison scores can be sorted and the top-k addresses having the best scores are fetched. Additionally, in a situation wherein none of the addresses from one or more databases meet the threshold criteria, the parsed address information (e.g., a parsed purchase order address) can be considered a new address and added to at least one of the one or more databases for future use.

As noted herein, for the extraction of addresses and/or address information from source documents (e.g., PO documents), a graph neural network-based document intelligence model is utilized. In one or more embodiments, such a model includes the capability of layout awareness, thus overcoming different structural challenges that can exist in processing various documents. Given such capabilities of the model, an architectural interface can be created, in one or more embodiments, in conjunction with the model, to assist in reducing errors related to address processing. As used here in this context, the architectural interface refers to connecting the dots required to automate an end-to-end address selection process. More specifically, the architectural interface refers to binding different components together and creating a concrete architecture which can handle different address selection processes.

As also detailed herein, address information parsing provides various address components (e.g., house number, street name, city, state, postal code, country, etc.) extracted from one or more address blocks of one or more source documents. Further, a parsed address comparison between entities can result in a matching and recommendation output. Address parsing can also be utilized as a part of a storing mechanism for storing address data in one or more databases.

For an address parsing model, as noted herein, at least one embodiment includes implementing at least one pre-trained address parsing NER model, trained on a significant number of address blocks spanning multiple countries and/or geographic regions, and trained to identify particular address aspects such as, for example, city information, state information, country information, postal code, etc. In one or more embodiments, such a pre-trained address parsing NER model is not trained to identify one or more particular address aspects, such as, for example, customer name and contact name. In such an embodiment, at least one additional NER model is generated and/or implemented in conjunction with the pre-trained NER.

Such an additional NER model, in one or more embodiments, includes a Keras-based bidirectional LSTM architecture (as further detailed, for example, in connection with FIG. 9) trained on address data available within one or more user-specific databases (e.g., one or more enterprise-specific databases). The input to such an LSTM model can include sequential address data tagged for various address entities, wherein such tags and/or annotations are embedded using a character-level embedding.

FIG. 2 shows an example data sample 200 for training an NER model in an illustrative embodiment. Data used for training a custom NER model (such as detailed above) can be derived from user-specific (e.g., enterprise-specific) address lines associated with historical user interactions (e.g., enterprise transactions). The character embedding of at least a portion of the training data, such as noted above, can be carried out, for example, using the Chars2Vec language model, resulting in a vector (e.g., a 50-dimensional vector) used by the LSTM for training. In one or more embodiments, the training data can also be manipulated by differing the sequence of data presented to the model for training. This provides the model with an ambiguous dataset, training the model to predict any given category of address information in any position of a source document and/or address block.

Figure 3:
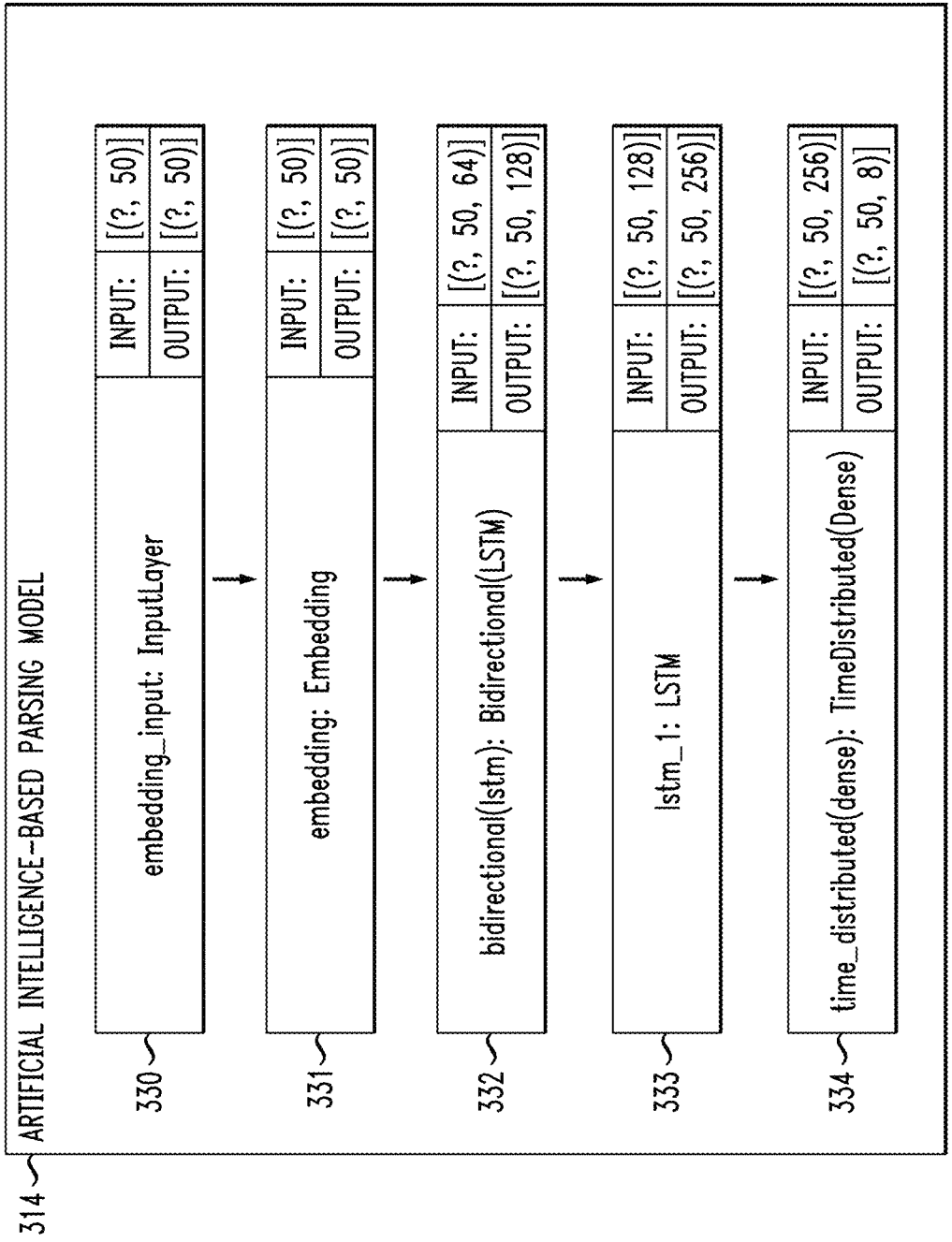
FIG. 3 shows example architecture of an NER in an illustrative embodiment.

FIG. 3 shows example architecture of an artificial intelligence-based parsing model (e.g., NER model) 314 in an illustrative embodiment. As depicted in FIG. 3, artificial intelligence-based parsing model 314 includes layers 330, 331, 332, 333 and 334. Specifically, input layer 330 allows the users to provide input to the neural network for any computation. By way of example, the number in input layer 330 which is 50 represents the length of the vector which needs to be provided as input. Also, embedding layer 331 converts the input vectors into vectors of n dimensions as chosen. Bidirectional LSTM layer 332 is a bidirectional wrapper for recurrent neural networks for classification problems, and LSTM layer 333 allows the neural network to selectively understand certain components and/or entities, facilitating the model to predict elements correctly. Further, time distributed dense layer 334 allows for time-step-based outputs, providing classification of the input and providing multiple outputs.

As noted above, in one or more embodiments, at least one bidirectional LSTM model is combined and/or used in conjunction with at least one pre-trained address parsing NER model to identify multiple fields (e.g., all fields) required for address matching and recommendation generation.

With address information extracted from a source document (e.g., a PO document) and parsed into individual address entities, the next step in one or more embodiments includes address matching and recommendation generation. For address matching and recommendation generation, at least a portion of the parsed address entities are matched with one or more address entities stored in one or more databases (e.g., enterprise-specific databases related to transactions) using at least one artificial intelligence-based algorithm formulated by combining various distance measures (e.g., Jaro-Winkler distance measure, Levenshtein distance measure, etc.) and one or more exact match principles which depend at least in part upon the nature of the entity being compared. Also, before a comparison is carried out, the parsed address information can be standardized with respect to one or more standardization measures (e.g., ISO 3166-1 alpha-3) for particular address aspects such as country names, postal code formatting, etc. Upon standardization, entity-to-entity comparison can be carried using an artificial intelligence-based address matching algorithm further detailed herein.

FIG. 4 shows a table 400 depicting an example pairing of artificial intelligence-based parsing models and artificial intelligence-based scoring models with various address information components in an illustrative embodiment. It is to be appreciated that FIG. 4 represents merely an example embodiment, and other models and/or other address information components can be utilized in one or more other embodiments.

In at least one embodiment, such an artificial intelligence-based address matching algorithm can be designed by taking into consideration which fields in an address block require special attention (e.g., customer name should be an exact match, house name and street should have increased weightage on the initial words, and postal code information should utilize a combination of exact match and fuzzy match techniques).

The comparison result of each entity can be ensembled into an overall match score based at least in part on which addresses components between the parsed address data (e.g., from a PO document) and stored address data (e.g., quote-related address information) were found to be a match or a mismatch.

If a given address component is deemed a match to a stored address component, then there will be no (separate)

recommendation generated (e.g., provided to an order processing team) for that address component; the given address component can be used as is. If a given address component is deemed to be a mismatch, then an address recommendation model, such as detailed herein, is invoked. In one or more embodiments, the base of such an address recommendation model is the same as the address matching algorithm described above. In addition to this, the addresses relevant to a particular and/or relevant user are fetched from at least one database and a filtering process is carried out to obtain and/or determine one or more addresses in the database which share one or more attributes with the mismatched address component (e.g., share the same postal code, etc.). Subsequently, the one or more addresses from the database are compared with that of the mismatched parsed address component using the matching algorithm, and a recommendation is provided using a given number of addresses (e.g., the top-k addresses) having at least a given overall match score.

By way merely of illustration, consider the following use case example and corresponding implementation of an example embodiment. Such a use case involves a sample PO document, from which address elements are to be extracted, parsed, and matched with corresponding quote details. Accordingly, in connection with the processing carried out by one or more of the models detailed herein, the address fields of the documents in question comprise the regions of interest.

A Fourier dilation-based graph neural network architecture (e.g., Fourier dilation techniques incorporated into a graph neural network such as detailed herein) is used to extract the address fields from the PO document as a block. The extracted address block is then parsed into individual address entities for facilitating the further steps of address matching and validation. Using the combination of a pre-trained NER model and a custom NER trained using enterprise-specific address information, address parsing is carried out on the extracted address block, providing multiple individual address entities.

With the extracted address block parsed, an artificial intelligence-based comparison algorithm for address matching is invoked to carry out an entity-to-entity comparison of address components between the respective PO and quote addresses. With an overall address comparison score between the PO and quote above, for example, a 95% match, the address in the quote can be used for directly processing the order. If, however, the overall address comparison score is less than a 95% match, the algorithm invokes an address recommendation module, which searches for similar addresses in one or more databases corresponding to the customer in question. In connection with such a search, based on the customer number available in the quote and the postal code available in the PO document, the search is carried out on the one or more databases, retrieving all addresses satisfying this criterion. Upon the data fetch, the address matching module compares all of the addresses fetched from the one or more databases with that of the PO, ultimately retrieving and/or identifying a given number of addresses (e.g., the top-three addresses) with the highest matching score.

FIG. 5 depicts a complete flow of the process of address extraction, address parsing, address matching and recommendation generation in accordance with the above-noted example use case in an illustrative embodiment. By way of illustration, FIG. 5 depicts a PO document 501, which is processed by artificial intelligence-based extraction model 512 to extract billing and/or shipping address information 550. Such address information 550 is processed by artificial intelligence-based parsing model 514 to generate and/or identify multiple address information components 551 (e.g., customer name, buyer contact, customer address, street information, postal code, city information, country information, etc.).

As also depicted in FIG. 5, billing and/or shipping address information 552 is extracted from an enterprise quote 503, and address information components 553 are derived from the address information 552. Additionally, address information components 551 and address information components 553 are then processed by artificial intelligence-based scoring model 516, which can, for example, including implementing a match scoring engine based on entity-to-entity matching techniques. A determination is then made in step 555 as to whether the output score from the artificial intelligence-based scoring model 516 is greater than 95%. If yes, then the address information from the enterprise quote 503 is selected for order booking in step 557. If no, then a search is carried out, using search component 565, on address-related information database 506 using one or more of the address components (e.g., customer name and postal code), and one or more items of address information selected in the search are processed (in connection with address information components 551) by artificial intelligence-based scoring model 516.

A determination is then made in step 559 as to whether the output score from this iteration of the artificial intelligence-based scoring model 516 is greater than 95%. If yes, then a given number (e.g., the top three) of the selected items of address information are recommended for use in order booking in step 561. If no, then the parsed PO address is displayed to an order process agent, giving the agent the option to add the new address to the database. Step 563 connects this algorithm to the user interface to display the parsed PO address and allow the order process agent to add the address to the database.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

FIG. 6 shows example pseudocode for implementing at least a portion of an artificial intelligence-based extraction algorithm in an illustrative embodiment. In this embodiment, example pseudocode 600 is executed by or under the control of at least one processing system and/or device. For example, the example pseudocode 600 may be viewed as comprising a portion of a software implementation of at least part of automated address data determination system 105 of the FIG. 1 embodiment.

The example pseudocode 600 illustrates using an input in the form of a PO document to generating an output in the form of an address block as a string. From the PO document, words and corresponding positional coordinates are extracted in step 1 using optical character recognition techniques and/or a text extraction mechanism. As also depicted in example pseudocode 600, the document is converted into images page-wise in step 2, and the outputs of step 1 and step 2 are provided to a graph neural network-based artificial intelligence model, which determines which words and/or positions correspond to an address block in step 3. The determined group(s) of words and/or positions are extracted and sent to a post-processing block in step 4, and the output of the post-processing block includes an address block to be used by a parsing algorithm for further processing in step 5.

It is to be appreciated that this particular example pseudocode shows just one example implementation of an artificial intelligence-based extraction algorithm, and alternative implementations of the process can be used in other embodiments.

FIG. 7 shows example pseudocode for implementing at least a portion of an artificial intelligence-based address parsing algorithm in an illustrative embodiment. In this embodiment, example pseudocode 700 is executed by or under the control of at least one processing system and/or device. For example, the example pseudocode 700 may be viewed as comprising a portion of a software implementation of at least part of automated address data determination system 105 of the FIG. 1 embodiment.

The example pseudocode 700 illustrates using an input in the form of an address block (such as one determined via example pseudocode 600) to generate an output in the form of a data frame including one or more individual address entities. In step 1, the address block is passed through an address expander unit, which expands one or more address abbreviations. In step 2, the expanded address is passed through a custom NER for the identification of customer name information and contact name information, wherein the custom NER is designed using a Keras bidirectional LSTM-based NER. In step 3, the identified names and/or name information are removed from the address block before being passed to a pretrained address NER. In step 4, the address block, without names, is passed to the pretrained NER to determine and/or obtain the individual address entity in a tabular format.

It is to be appreciated that this particular example pseudocode shows just one example implementation of an artificial intelligence-based address parsing algorithm, and alternative implementations of the process can be used in other embodiments.

FIG. 8 shows example pseudocode for implementing at least a portion of an artificial intelligence-based scoring model in an illustrative embodiment. In this embodiment, example pseudocode 800 is executed by or under the control of at least one processing system and/or device. For example, the example pseudocode 800 may be viewed as comprising a portion of a software implementation of at least part of automated address data determination system 105 of the FIG. 1 embodiment.

The example pseudocode 800 illustrates using an input in the form of address information in parsed structural format (e.g., a tabular format, such as generated using example pseudocode 700) to generate an output in the form of a similarity score. In step 1, the parsed addresses and/or address information are standardized for country (e.g., using abbreviations). In step 2, each address entity is individually compared between the addresses using an algorithm such as detailed in connection with FIG. 4. In step 3, a similarity percentage of each entity is determined, in step 4, the final score is averaged to the number of entities, and in step 5, the final score is output and/or returned (to at least one user).

It is to be appreciated that this particular example pseudocode shows just one example implementation of an artificial intelligence-based scoring model, and alternative implementations of the process can be used in other embodiments.

FIG. 9 shows example pseudocode for implementing at least a portion of a Keras-based bidirectional LSTM-based NER model in an illustrative embodiment. In this embodiment, example pseudocode 900 is executed by or under the control of at least one processing system and/or device. For example, the example pseudocode 900 may be viewed as comprising a portion of a software implementation of at least part of automated address data determination system 105 of the FIG. 1 embodiment.

The example pseudocode 900 illustrates steps for adding embeddings, adding bidirectional LSTM information, adding LSTM information, adding time distributed information, carrying out one or more optimization techniques as well as loss functions and/or other metrics.

It is to be appreciated that this particular example pseudocode shows just one example implementation of a Keras-based bidirectional LSTM-based NER model, and alternative implementations of the process can be used in other embodiments.

Figure 10:
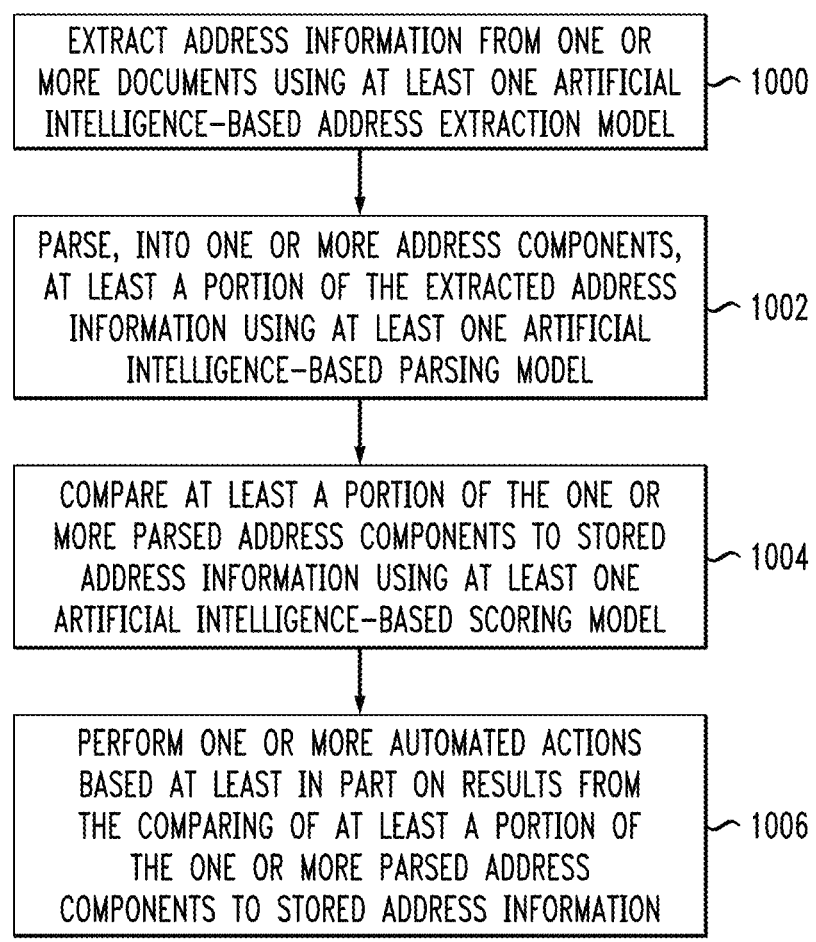
FIG. 10 is a flow diagram of a process for automated address data determinations using artificial intelligence techniques in an illustrative embodiment.

FIG. 10 is a flow diagram of a process for automated address data determinations using artificial intelligence techniques in an illustrative embodiment. It is to be understood that this particular process is only an example, and additional or alternative processes can be carried out in other embodiments.

In this embodiment, the process includes steps 1000 through 1006. These steps are assumed to be performed by the automated address data determination system 105 utilizing elements 112, 114, 116 and 118.

Step 1000 includes extracting address information from one or more documents using at least one artificial intelligence-based address extraction model. In at least one embodiment, extracting address information from one or more documents includes processing at least a portion of the address information using at least one graph neural network in conjunction with leveraging one or more textual features and leveraging one or more visual features.

Step 1002 includes parsing, into one or more address components, at least a portion of the extracted address information using at least one artificial intelligence-based parsing model. In one or more embodiments, parsing at least a portion of the extracted address information includes processing the extracted address information using one or more named entity recognition models. In such an embodiment, processing the extracted address information using one or more named entity recognition models can include processing the extracted address information using one or more of a first named entity recognition model trained on global address information, and a second named entity recognition model (e.g., a bidirectional LSTM model) trained on predetermined address information related to a particular user context.

Step 1004 includes comparing at least a portion of the one or more parsed address components to stored address information using at least one artificial intelligence-based scoring model. In at least one embodiment, comparing at least a portion of the one or more parsed address components to stored address information includes implementing at least one artificial intelligence-based scoring model comprising a combination of fuzzy logic and one or more distance measures. In such an embodiment, the one or more distance measures can include at least one of a Jaro-Winkler distance measure and a Levenshtein distance measure. Additionally or alternatively, comparing at least a portion of the one or more parsed address components to stored address information can include validating at least a portion of the one or more parsed address components against one or more portions of the stored address information using one or more entity-to-entity matching techniques.

Step 1006 includes performing one or more automated actions based at least in part on results from the comparing of at least a portion of the one or more parsed address components to stored address information. In one or more embodiments, performing one or more automated actions includes automatically training, based at least in part on results from the comparing of at least a portion of the one or more parsed address components to stored address information, one or more of the at least one artificial intelligence-based address extraction model, the at least one artificial intelligence-based parsing model, and the at least one artificial intelligence-based scoring model. Additionally or alternatively, performing one or more automated actions can include identifying one or more items of address information, from the stored address information, having a highest level of similarity to the one or more parsed address components upon a determination that the results comprise a matching score below a given threshold value, and/or outputting a notification indicating acceptance of the one or more parsed address components upon a determination that the results comprise a matching score above a given threshold value.

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to perform automated address data determinations using artificial intelligence techniques. These and other embodiments can effectively overcome problems associated with resource-intensive and error-prone techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors.

Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
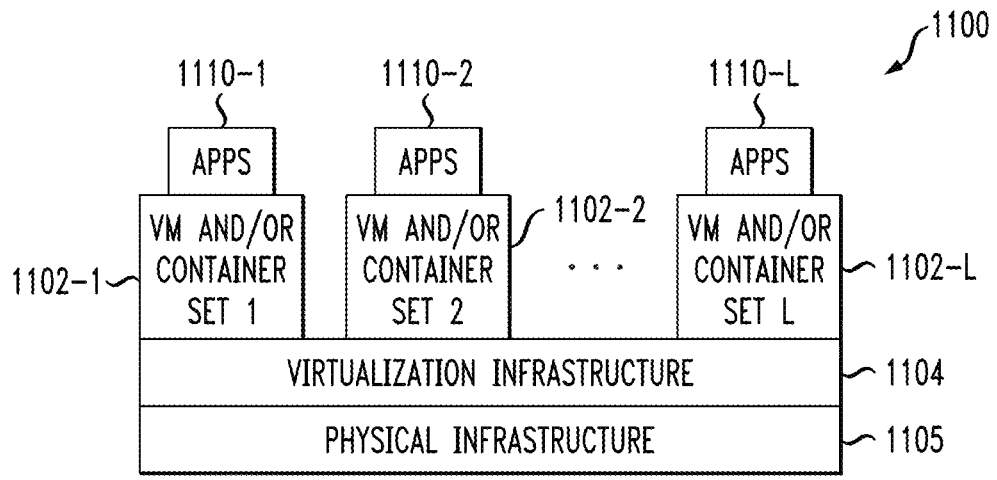
FIGS. 11 and 12 show examples of processing platforms that may be utilized to implement at least a portion of an information processing system in illustrative embodiments.
Figure 12:
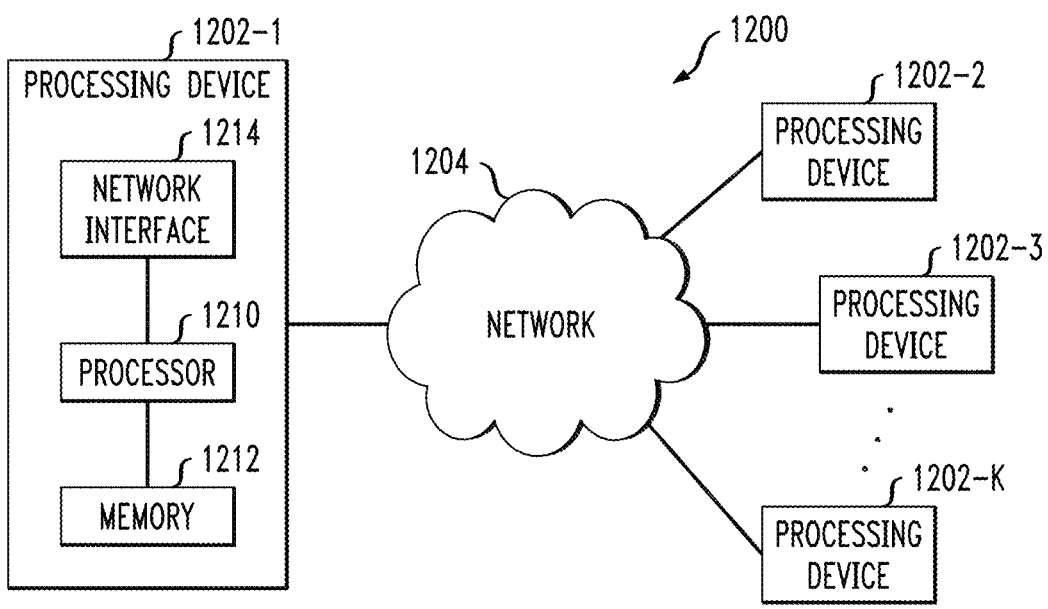

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more information processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a CPU, a GPU, a TPU, a microcontroller, an ASIC, a FPGA or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   extracting address information from one or more documents using at least one artificial intelligence-based address extraction model, wherein extracting address information comprises determining at least one of one or more textual features and one or more visual features within at least a portion of the one or more documents by processing the at least a portion of the one or more documents using at least one graph neural network;

parsing, into one or more address components, at least a portion of the extracted address information using at least one artificial intelligence-based parsing model, wherein parsing at least a portion of the extracted address information comprises processing the at least a portion of the extracted address information using at least a first named entity recognition model trained on global address information, and at least a second named entity recognition model trained on designated address information associated with at least one particular context related to the one or more documents, and wherein processing the at least a portion of the extracted address information using the at least a first named entity recognition model comprises annotating one or more designated address entities in the at least a portion of the extracted address information using one or more character-level embedding techniques;

comparing at least a portion of the one or more parsed address components to stored address information using at least one artificial intelligence-based scoring model; and performing one or more automated actions based at least in part on results from the comparing of at least a portion of the one or more parsed address components to stored address information;

wherein the method is performed by at least one processing device comprising a processor coupled to a memory.

2. The computer-implemented method of claim 1, wherein parsing at least a portion of the extracted address information comprises processing the extracted address information using multiple named entity recognition models.

3. The computer-implemented method of claim 1, wherein the at least a second named entity recognition model comprises a bidirectional long short-term memory model.

4. The computer-implemented method of claim 1, wherein comparing at least a portion of the one or more parsed address components to stored address information comprises implementing at least one artificial intelligence-based scoring model comprising a combination of fuzzy logic and one or more distance measures.

5. The computer-implemented method of claim 4, wherein the one or more distance measures comprise at least one of a Jaro-Winkler distance measure and a Levenshtein distance measure.

6. The computer-implemented method of claim 1, wherein comparing at least a portion of the one or more parsed address components to stored address information comprises validating at least a portion of the one or more parsed address components against one or more portions of the stored address information using one or more entity-to-entity matching techniques.

7. The computer-implemented method of claim 1, wherein performing one or more automated actions comprises automatically training, based at least in part on results from the comparing of at least a portion of the one or more parsed address components to stored address information, one or more of the at least one artificial intelligence-based address extraction model, the at least one artificial intelligence-based parsing model, and the at least one artificial intelligence-based scoring model.

8. The computer-implemented method of claim 1, wherein performing one or more automated actions comprises identifying one or more items of address information, from the stored address information, having a highest level of similarity to the one or more parsed address components upon a determination that the results comprise a matching score below a given threshold value.

9. The computer-implemented method of claim 1, wherein performing one or more automated actions comprises outputting a notification indicating acceptance of the one or more parsed address components upon a determination that the results comprise a matching score above a given threshold value.

10. A non-transitory processor-readable storage medium having stored therein program code of one or more software programs, wherein the program code when executed by at least one processing device causes the at least one processing device:

to extract address information from one or more documents using at least one artificial intelligence-based address extraction model, wherein extracting address information comprises determining at least one of one or more textual features and one or more visual features within at least a portion of the one or more documents by processing the at least a portion of the one or more documents using at least one graph neural network;

to parse, into one or more address components, at least a portion of the extracted address information using at least one artificial intelligence-based parsing model, wherein parsing at least a portion of the extracted address information comprises processing the at least a portion of the extracted address information using at least a first named entity recognition model trained on global address information, and at least a second named entity recognition model trained on designated address information associated with at least one particular context related to the one or more documents, and wherein processing the at least a portion of the extracted address information using the at least a first named entity recognition model comprises annotating one or more designated address entities in the at least a portion of the extracted address information using one or more character-level embedding techniques;

to compare at least a portion of the one or more parsed address components to stored address information using at least one artificial intelligence-based scoring model; and to perform one or more automated actions based at least in part on results from the comparing of at least a portion of the one or more parsed address components to stored address information.

11. The non-transitory processor-readable storage medium of claim 10, wherein parsing at least a portion of the extracted address information comprises processing the extracted address information using multiple named entity recognition models.

12. The non-transitory processor-readable storage medium of claim 10, wherein comparing at least a portion of the one or more parsed address components to stored address information comprises implementing at least one artificial intelligence-based scoring model comprising a combination of fuzzy logic and one or more distance measures.

13. The non-transitory processor-readable storage medium of claim 10, wherein performing one or more automated actions comprises automatically training, based at least in part on results from the comparing of at least a portion of the one or more parsed address components to stored address information, one or more of the at least one artificial intelligence-based address extraction model, the at least one artificial intelligence-based parsing model, and the at least one artificial intelligence-based scoring model.

14. An apparatus comprising:
at least one processing device comprising a processor coupled to a memory;
the at least one processing device being configured:
to extract address information from one or more documents using at least one artificial intelligence-based address extraction model, wherein extracting address information comprises determining at least one of one or more textual features and one or more visual features within at least a portion of the one or more documents by processing the at least a portion of the one or more documents using at least one graph neural network;
to parse, into one or more address components, at least a portion of the extracted address information using at least one artificial intelligence-based parsing model, wherein parsing at least a portion of the extracted address information comprises processing the at least a portion of the extracted address information using at least a first named entity recognition model trained on global address information, and at least a second named entity recognition model trained on designated address information associated with at least one particular context related to the one or more documents, and wherein processing the at least a portion of the extracted address information using the at least a first named entity recognition model comprises annotating one or more designated address entities in the at least a portion of the extracted address information using one or more character-level embedding techniques;
to compare at least a portion of the one or more parsed address components to stored address information using at least one artificial intelligence-based scoring model; and
to perform one or more automated actions based at least in part on results from the comparing of at least a portion of the one or more parsed address components to stored address information.

15. The apparatus of claim 14, wherein parsing at least a portion of the extracted address information comprises processing the extracted address information using multiple named entity recognition models.

16. The apparatus of claim 14, wherein comparing at least a portion of the one or more parsed address components to stored address information comprises implementing at least one artificial intelligence-based scoring model comprising a combination of fuzzy logic and one or more distance measures.

17. The apparatus of claim 14, wherein performing one or more automated actions comprises automatically training, based at least in part on results from the comparing of at least a portion of the one or more parsed address components to stored address information, one or more of the at least one artificial intelligence-based address extraction model, the at least one artificial intelligence-based parsing model, and the at least one artificial intelligence-based scoring model.

18. The apparatus of claim 14, wherein performing one or more automated actions comprises identifying one or more items of address information, from the stored address information, having a highest level of similarity to the one or more parsed address components upon a determination that the results comprise a matching score below a given threshold value.

19. The apparatus of claim 14, wherein performing one or more automated actions comprises outputting a notification indicating acceptance of the one or more parsed address components upon a determination that the results comprise a matching score above a given threshold value.

20. The apparatus of claim 14, wherein the at least a second named entity recognition model comprises a bidirectional long short-term memory model.

* * * * *